United States Patent
Witzgall

(10) Patent No.: US 12,205,242 B2
(45) Date of Patent: Jan. 21, 2025

(54) METHOD AND SYSTEM FOR ACCELERATING RAPID CLASS AUGMENTATION FOR OBJECT DETECTION IN DEEP NEURAL NETWORKS

(71) Applicant: Leidos, Inc., Reston, VA (US)

(72) Inventor: Hanna Witzgall, Chantilly, VA (US)

(73) Assignee: Leidos, Inc., Reston, VA (US)

(*) Notice: Subject to any disclaimer, the term of this patent is extended or adjusted under 35 U.S.C. 154(b) by 413 days.

(21) Appl. No.: 17/840,238

(22) Filed: Jun. 14, 2022

(65) Prior Publication Data

US 2023/0010033 A1 Jan. 12, 2023

Related U.S. Application Data

(60) Provisional application No. 63/217,739, filed on Jul. 1, 2021.

(51) Int. Cl.
G06T 3/4046 (2024.01)
G06T 7/194 (2017.01)

(52) U.S. Cl.
CPC ............ *G06T 3/4046* (2013.01); *G06T 7/194* (2017.01)

(58) Field of Classification Search
CPC .................. G06T 3/4046; G06T 7/194; G06T 2207/20081; G06T 2207/20084; G06T 7/73

See application file for complete search history.

(56) References Cited

U.S. PATENT DOCUMENTS

| | | | |
|---|---|---|---|
| 9,607,233 B2* | 3/2017 | Kaizerman | G06V 10/774 |
| 11,074,711 B1 | 7/2021 | Akbas | |
| 2008/0089591 A1 | 4/2008 | Zhou | |
| 2015/0120626 A1* | 4/2015 | Gupta | G06N 3/088 |
| | | | 706/20 |
| 2021/0073637 A1 | 3/2021 | Witzgall | |

OTHER PUBLICATIONS

H. Witzgall, "Rapid Class Augmentation for Continuous Deep Learning Applications," International Conference on Machine Learning Applications (ICMLA), 2020.
R. Venkatesan and M.J. Er, "A Novel Progressive Learning Technique for Multi-class Classification", arXiv:1609.00085v1, Sep. 1, 2016.
R. Venkatesan and M.J. Er, "A Novel Progressive Learning Technique for Multi-class Classification", arXiv:1609.00085v2, Jan. 22, 2017.
G.B. Huang, L. Chen, "Extreme Learning Machine: A New Learning Scheme of Feedforward Neural Networks", Proceedings of International Joint Conference on Neural Networks, vol. 2, pp. 985-990, 2004.

(Continued)

*Primary Examiner* — Christopher M Brandt
(74) *Attorney, Agent, or Firm* — Dawn-Marie Bey; Bey & Cotropia PLLC

(57) ABSTRACT

Object detection architectures for detecting and classifying objects in an image are modified to incorporate an extending Rapid Class Augmentation (XRCA) progressive learning algorithm with its defining aspect of memory built into its optimizer which allows joint optimization over both the old and the classes using just the new class data and eliminates the issues associated with catastrophic forgetting.

11 Claims, 14 Drawing Sheets

(56) References Cited

OTHER PUBLICATIONS

G.B. Huang, L. Chen, C.K. Siew, "Universal Approximation Using Incremental Construction Feedforward Networks with Random Hidden Nodes", IEEE Transactions on Neural Networks, vol. 17, No. 4, pp. 879-892, 2006.

Chuanqi Tan, Fuchun Sun, Tao Kong, Wenchang Zhang, Chao Yang, Chunfang Liu, "A Survey on Deep Transfer Learning," arXiv:1808.01974, Aug. 6, 2018.

LeCun, Yann; Cortez, Corinna; Burges, Christopher C.J., "*The MNIST Database of Handwritten Digits*" [online] [retrieved Oct. 29, 2020], 7 pp., Retrieved from the Internet: yann.lecun.com/exdb/mnist/.

W.H. Hager. "Updating the inverse of a matrix," SIAM Review, 31(2):221-239, Jun. 1989.

J. Howard, "Imagenette" [online], [retrieved on Oct. 29, 2020], Retrieved from the Internet: https://github.com/fastai/imagenette.

"Python vs. R for Artificial Intelligence, Machine Learning, and Data Science," by Scenario or Task by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/python-vs-or-r-artificial-intelligence-ai-machine-learning-data-science-which-use, 27 pp.

"Production vs Development Artificial Intelligence and Machine Learning," by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/development-vs-or-production-batch-offline-online-automated-artificial-intelligence-ai-machine-learning, 24 pp.

"Advanced Analytics Packages, Frameworks, and Platforms," by Alex Castrounis of Innoarchitech, published online by O'Reilly Media, Copyright InnoArchiTech LLC 2020 [retrieved Oct. 16, 2020], Retrieved from the Internet: https://www.innoarchitech.com/blog/packages-frameworks-platforms-by-scenario-task-artificial-intelligence-ai-machine-learning-data-science, 29 pp.

M. Arif Wani, et al., "Advances in Intelligent Systems and Computing," vol. 1395, Deep Learning Applications, vol. 3, Springer, Copyright 2022.

Tsung-Yi Lin, et al., "Microsoft COCO: Common Objects in Context," arXiv:1405.0312v3, Feb. 21, 2015.

H. Witzgall, "Deep Rapid Class Augmentation: A New Progressive Learning Approach that Eliminates the Issue of Catastrophic Forgetting," Deep Learning Applications, vol. 3, Springer, Oct. 2021.

S.-A. Rebuffi, A. Kolesnikov, G. Sperl, and C. H. Lampert, "icarl: Incremental classifier and representation learning," in CVPR, 2017, pp. 2001-2010. (iCARL Replay).

H. Shin, J. K. Lee, J. Kim, and J. Kim, "Continual learning with deep generative replay," in NeurIPS, 2017, pp. 2990-2999.

C. Fernando, D. Banarse, C. Blundell, Y. Zwols, D. Ha, A. A. Rusu, A. Pritzel, and D. Wierstra, "Pathnet: Evolution channels gradient descent in super neural networks," arXiv preprint arXiv:1701.08734, 2017.

Ren, B.; Wang, H.; Li, J.; and Gao, H. 2017. Life-long learning based on dynamic combination model. Applied Soft Computing 56:398-404.

J. Kirkpatrick, R. Pascanu, N. Rabinowitz, J. Veness, G. Desjardins, A. A. Rusu, K. Milan, J. Quan, T. Ramalho, A. GrabskaBarwinska et al., "Overcoming catastrophic forgetting in neural networks," PNAS, p. 201611835, 2017. (EWC regularization).

C. V. Nguyen, Y. Li, T. D. Bui, and R. E. Turner, "Variational continual learning," arXiv preprint arXiv:1710.10628, 2017. (VCL).

Z. Li and D. Holem, "Learning without Forgetting", https://arxiv.org/abs/1606.09282, Feb. 2017 (LwF).

K. Shmelkov, C. Schmid, and K. Alahari, "Incremental learning of object detectors without catastrophic forgetting," in ICCV, 2017, pp. 3400-3409.

A. Rannen, R. Aljundi, M. B. Blaschko, and T. Tuytelaars, "Encoder based lifelong learning," in ICCV, 2017, pp. 1320-1328.

Zixuan Ke1, Bing Liu1, Nianzu Ma1, Hu Xu2 and Lei Shu3, "Achieving Forgetting Prevention and Knowldege Transfer in Continual Learning", NeuraIPS 2021.

H.Jung, J.Ju, M.Jung and J.Kim, "Less-forgetting Learning in Deep Neural Networks", https://arxiv.org/abs/1607.00122, Jul. 2016.

M. De Lange, R. Aljundi, M.Masana, S. Parisot, X. Jia, A. Leonardis, G. Slabaugh, T. Tuytelaars, A continual leraning survey: Defying forgetting in classification tasks, Apr. 2021, https://arxiv.org/pdf/1909.08383.pdf (University of Kansas).

R. Kemker, M. Mclure, A. Abinto, T. Hayes, C. Kanan, "Measuring Catastrophic Forgetting in Neural Networks", Nov. 2017, https://arxiv.org/pdf/1708.02072.pdf (Rochester Institute of Technology).

Mathilde Caron, Hugo Touvron, Ishan Misra, Herve Jegou, Julien Mairal, Piotr Bojanowski, Armand Joulin, "Emerging Properties in Self-Supervised Vision Transformers", May 2021, arXiv:2104.14294v2.

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, Neil Houlsby, "An Image is Worth 16×16 Words: Transformers for Image Recognition at Scale", Jun. 2021, arXiv:2010.11929.

T. Hastie, R. Tibshirani, J. Friedman, The Elements of Statistical Learning, Springer Series in Statistics. New York: Springer-Verlag, 2001.

Li, Y., Mao, H., Girshick, R. and He, K., Oct. 2022. Exploring plain vision transformer backbones for object detection. In European conference on computer vision (pp. 280-296). Cham: Springer Nature Switzerland.

Vaswani, A., Shazeer, N., Parmar, N., Uszkoreit, J., Jones, L., Gomez, A.N., Kaiser, L. and Polosukhin, I., 2017. Attention is All You Need. (Nips), 2017. arXiv preprint arXiv:1706.03762, 10, p. S0140525X16001837.

J. Jang, S. Ye, S. Yang, J. Shin, J. Han, G. Kim, S. Jungkyu Choi, M. Seo, 'Towards Continual Knowledge Learning of Language Models', May 2022, https://arxiv.org/pdf/2110.03215.pdf.

M. Biesialska, K.a Biesialska, M. R. Costa-jussa, 'Continual Lifelong Learning in Natural Language Processing: A Survey' Proceedings of the 28th International Conference on Computational Linguistics, pp. 6523-6541 Barcelona, Spain (Online), Dec. 8-13, 2020; https://aclanthology.org/2020.coling-main.574.pdf.

Tongtong Wu, Massimo Caccia, Zhuang Li, Yuan-Fang Li, Guilin Qi, Gholamreza Haffari, 'Pretrained Language Model in Continual Learning: A Comparative Study', International Conference on Learning Representations (ICLR) May 2022, https://researchmgt.monash.edu/ws/portalfiles/portal/470247539/466809118_oa.pdf.

Jacob Devlin Ming-Wei Chang Kenton Lee Kristina Toutanova, 'BERT: Pre-training of Deep Bidirectional Transformers for Language Understanding', May 2019; https://arxiv.org/pdf/1810.04805.pdf.

Victor Sanh, Lysandre Debut, Julien Chaumond, Thomas Wolf, 'DistilBERT, a distilled version of BERT: smaller, faster, cheaper and lighter', Mar. 2020; https://arxiv.org/pdf/1910.01108.pdf.

BBC News Archive dataset for topic classification; https://www.kaggle.com/datasets/hgultekin/bbcnewsarchive (retrieved Sep. 8, 2024).

CoNLL Named-Enity-Recognition dataset https://paperswithcode.com/dataset/conll-2003 (retrieved Sep. 6, 2024).

\* cited by examiner

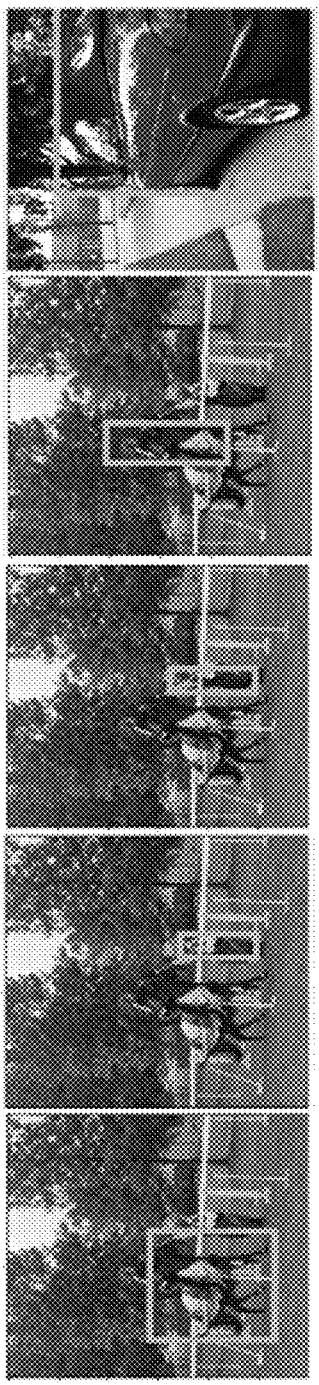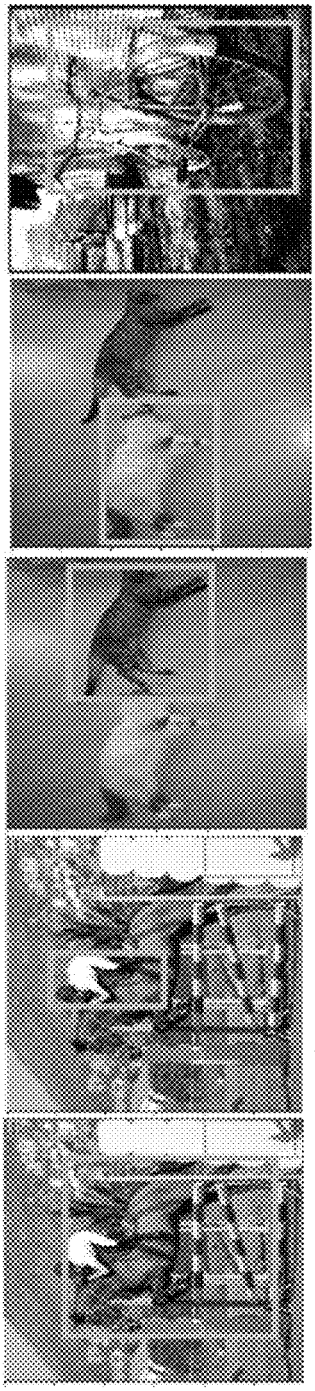

METHOD AND SYSTEM FOR ACCELERATING RAPID CLASS AUGMENTATION FOR OBJECT DETECTION IN DEEP NEURAL NETWORKS

CROSS-REFERENCE TO RELATED APPLICATIONS

The present application claims benefit of priority to U.S. Provisional Patent Application No. 63/217,739, entitled "Accelerating Rapid Class Augmentation for Object Detection in Deep Neural Networks" filed on Jul. 1, 2021.

The following co-application is incorporated herein by reference in its entirety: U.S. patent application Ser. No. 17/083,969, entitled "Deep Rapid Class Augmentation," filed Oct. 29, 2010 (969 Patent Application). Additionally, the following publications having one more overlapping inventors and authors are also incorporated herein by reference: H. Witzgall, "Rapid Class Augmentation for Continuous Deep Learning Applications," International Conference on Machine Learning Applications (ICMLA), 2020, and H. Witzgall, "Deep Rapid Class Augmentation: A New Progressive Learning Approach that Eliminates the Issue of Catastrophic Forgetting," Deep Learning Applications, Vol. 3, Springer, October 2021.

BACKGROUND

Technical Field

The embodiments relate generally to object detection by a trained neural network and more specifically to sequential learning of new objects on an existing object detection model.

Description of Related Art

Deep neural networks have been shown to be highly effective at classification tasks when data from all classes is simultaneously available during training. However, much less progress has been made in the critical area of progressive learning where new tasks are learned sequentially and data for all classes is not available at the time the original model is created.

Transfer learning using finetuning is a well-known technique that also uses previously learned knowledge to facilitate the learning of new classes and has been successfully demonstrated over a wide range of applications. It works by 1) taking a model that is pretrained on a source domain (where the data is often abundant); 2) adapting its output layers to define the new set of classes; and 3) retraining or 'finetuning' the network via backpropagation. Although this approach leverages previously learned knowledge for feature extraction, it is unsuitable for continuous learning frameworks that seek to build larger capacity models in a progressive manner. This is because transfer learning techniques typically discard the 'transferred' network's last classification layer when adapting the network to its new target tasks. This discards the prior knowledge of the previously learned classes and therefore transfer learning by itself is not a progressive learning algorithm.

Progressive algorithms typically preserve the old model's classification weights and add new weights to accommodate new classes. However, when these augmented weights are trained using the well-known stochastic gradient descent (SGD) algorithm on the new class data the training process will cause the model's performance on the previously learned classes to degrade significantly in the optimizer's pursuit of new class performance. This issue is known as catastrophic forgetting and is a key challenge in the progressive learning community.

There have been multiple methods proposed to mitigate the impact of catastrophic forgetting. For example, Learning with Less Forgetting described in H. Jung et al., "Less-forgetting Learning in Deep Neural Networks," https://arxiv.org/abs/1607.00122, July 2016; Learning without Forgetting described in Z. Li et al., "Learning without Forgetting", https://arxiv.org/abs/1606.09282, February 2017; and Overcoming Catastrophic Forgetting described in J. Kirkpatrick, et al. "Overcoming Catastrophic Forgetting in Neural Networks in Proceedings of the National Academy of Sciences (PNAS) of the United States of America, March 2017, all attempt to mitigate the performance degradation of previously learned classes by penalizing the optimizer from changing the networks weights in ways that impact the old classification output. But none of these approaches guarantee optimal joint classification accuracy across both the old and the new tasks when the network is trained in a sequential manner.

This motivated the development of the eXtending Rapid Class Augmentation (XRCA) progressive learning algorithm with its defining aspect of memory built into its optimizer as described in the '969 Patent Application. The incorporation of memory allows joint optimization over both the old and the new classes using just the new class data and eliminates the issues associated with catastrophic forgetting.

This capability results in several important benefits. First, it means that an XRCA progressive framework can often train orders of magnitude faster than an optimizer that uses SGD because it only has to train on the new class data. It also significantly reduces the data storage requirements because the algorithm can discard all previously learned training data which otherwise must be stored for future augmentation. Finally, it produces a more scalable continuous learning algorithm that decouples the training time required to learn a new class from the number of previously learned classes. This eliminates exponentially increasing training times as the model capacity grows and creates a more scalable learning process.

SUMMARY OF THE EMBODIMENTS

In a first exemplary embodiment, a computer-implemented process for augmenting an object detection architecture for detecting objects in an image, includes: training an object detection architecture trained to detect for n object classes to detect for n+c object classes, wherein the object detection architecture is trained to detect for n+c object classes using training data for only the c object class; and further wherein an object detection accuracy for then object classes is maintained after the object detection architecture is trained to detect for n+c object classes using training data for only the c object class.

In a second exemplary embodiment, an object detection architecture for detecting objects in an image, includes: an object detection backbone including a feature extractor, the feature extractor including one or more prediction heads for predicting features in the image, wherein the predicted features could be indicative of one or more objects in the image; and one or more filter models trained to classify n known objects using training data for the n objects, wherein the one or more filter models filter the predicted features to classify one or more objects in the image in accordance with the n known objects, each of the one or more filter models includes a prediction weight matrix, an inverse feature covariance matrix, and a null-class vector; and further wherein the one or more filter models can be trained to classify n+s known objects using training data for only the s objects such that a classification accuracy of the object detection architecture for the n objects is maintained.

In a third exemplary embodiment, an object detection architecture for detecting objects in an image, includes: an object detection backbone including multiple feature maps; one or more prediction head models trained to classify n known objects using training data, including the multiple feature maps, wherein each of the prediction head models includes a prediction weight matrix, an inverse feature covariance matrix, and a null-class vector; and further wherein the one or more prediction head models can be trained to classify n+s known objects using training data for only the s objects such that a classification accuracy of the object detection architecture for the n objects is maintained.

BRIEF DESCRIPTION OF THE FIGURES

The embodiments will be described below and reference will be made to the figures, in which:

FIGS. 12A, 12B, 12C, 12D, 12E, 12F, 12G, 12H, 12I, 12J, 12K, 12L, 12M, 12N, 12O show objects correctly detected by the XRCA-SSD model in accordance with an embodiment herein;

DETAILED DESCRIPTION

Figure 1:
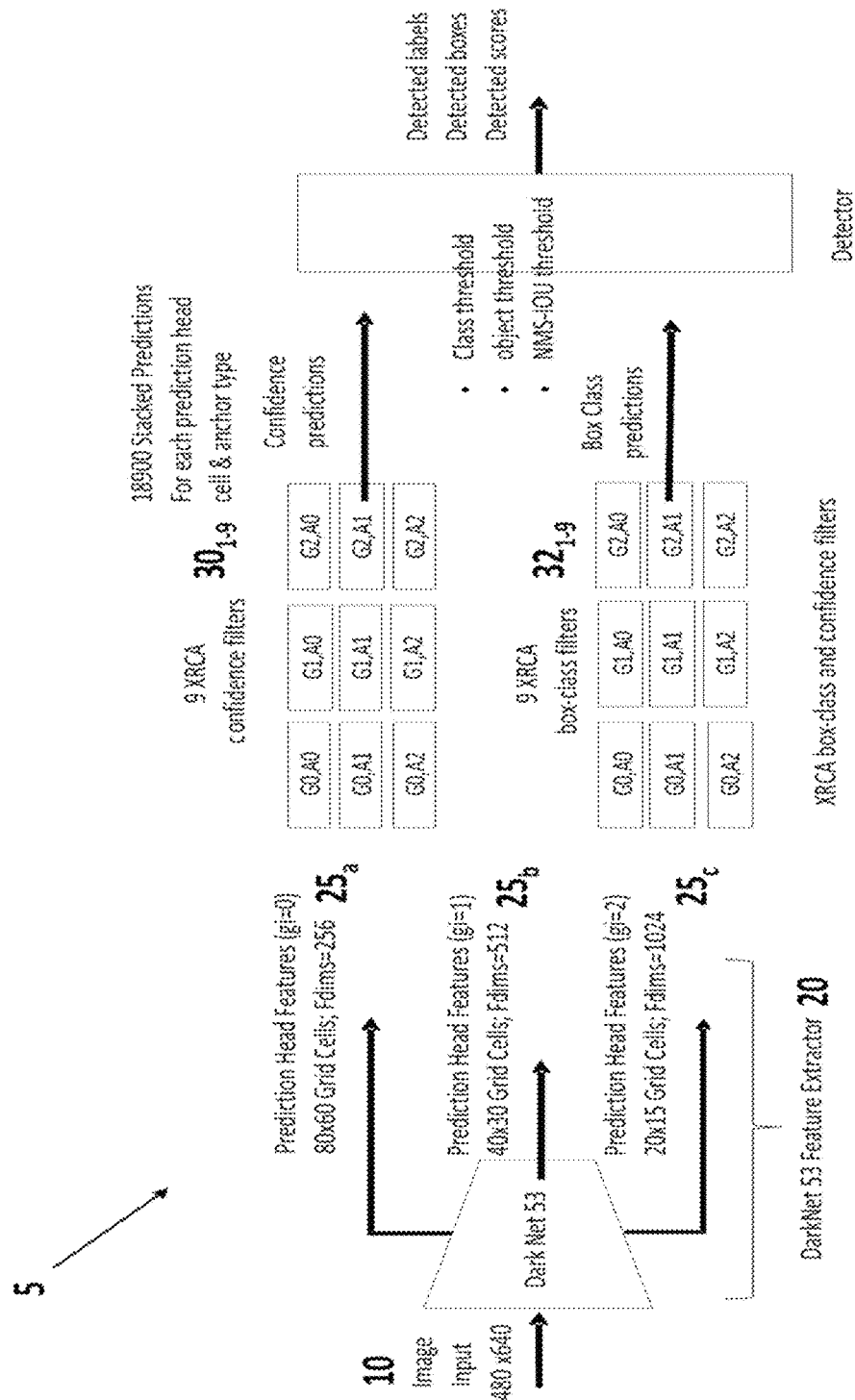
FIG. 1 is a block diagram of XRCA-YOLOv3 architecture in accordance with one or more embodiments herein.

The core XRCA algorithm is based on a recursive least squares (RLS) implementation that is modified to address the sequential learning task and is described in detail in '969 Patent Application. A key insight in its creation was to view sequential learning as a recursive process where new data continuously updates the model weights and new classes can be viewed as simply classes for which there have been no prior positive training examples. XRCA is an optimization algorithm that has memory, which allows it to jointly optimize both the old weights and the new class weights based only on the new training data. This memory allows XRCA optimization to be independent of the class distribution in a training batch or even across batches, as long as it has seen the data at least once before. One benefit of incorporating memory into the optimization algorithm is that old training data can be discarded once learned, since it is not necessary for adding new classes in the future. Another benefit is that the training time required to augment a model depends only on the amount of training data in the new class rather than the amount of data required to train all classes. This can lead to significantly reduced augmentation training times for large models. Memory also prevents exponential growth in the training time to learn a new class since the computational effort scales with the amount of new class data rather than all prior existing class data. Thus, XRCA's optimization memory provides both the benefits of reduced the data storage requirements and reduced model augmentation training times.

The XRCA algorithm modifies the standard RLS algorithm to enable learning a new class (not just weight updates with additional data) by adding a new class vector to the linear classification matrix. This new class initialization vector is computed using all the prior training examples of what the new class is not and is called the null-class vector because it resides in a null space of the span of previously learned classes. By initializing a new class with this null class vector, the filter already has been taught the negative class examples and now can be optimally and sequentially trained given just the new positive class examples.

XRCA's null-class initialization approach contrasts with the standard Progressive SGD method that randomly initializes the new class vector before proceeding to train it across all data classes. Progressive SGD's random new class initialization method has the drawbacks of 1) incorporating none of the information from previous data classes which provides information on what the new class is not and 2) having a random chance of interfering with previous trained classes (which it will not be able to correct unless it has access to their training data again as well).

After initialization and class augmentation, the augmented model is trained on the new class data in a manner that updates all classification tasks given the new class features. The combination of this null-class initialization vector and the feature preserving properties of the RLS's inverse feature correlation matrix provide the memory for the XRCA optimizer to sequentially train on new classes while not forgetting previously learned classification tasks.

The implementation of XRCA's progressive learning process can be thought of as consisting of 3 functional components. The first functional component initializes the model and computes the core XRCA model elements which consists of a prediction weight matrix, an inverse feature covariance matrix, and a null-class vector. Future model updates will depend on these three core XRCA model elements. The second functional component is used to update the model when additional training data is available, but no new classes are introduced. And the third functional component is used to augment the model with a new class. This component initiates the new class vector with the current model's null-class vector and then proceeds to optimize all the model's class weights using just the new class data and the memory from the inverse covariance feature matrix.

Accordingly, an XRCA optimization model consists of three components: 1) a weight matrix, 2) an inverse feature covariance matrix, 3) and a null-class vector. The weight matrix maps a network's features to its existing classes. The inverse feature covariance matrix stores previously seen feature correlation data and acts as the model's memory. The null-class vector is used to initialize a new class with the prior information on what the new class is not. It is essentially a weight vector computed in a recursive manner by updating weights using feature data with all negative labels. The equations below summarize the main XRCA operations which are: 1) model initialization; 2) existing weight updates (new data, no new classes); 3) model augmentation (new classes).

These XRCA operations will be utilized in training the object detection weights. For example, for XRCA-SSD object detection the filter tasks are divided into an estimation of bounding box prediction and background/class prediction. XRCA-SSD uses XRCA operation 2) to update the box filter weights when new objects are added but the filter remains the same size in predicting the 4 bounding box coordinates. XRCA-SSD uses XRCA operation 3) to update the bkg-class weights because for these weights adding a new class increases the filter size.

Similarly, XRCA-YOLOv3 uses XRCA operation 2) to update its binary confidence filters which also do not increase in size as more classes are added. And it uses XRCA operation 3) to update its box-class weights which do increase in filter size as more classes are added.

In these examples we see that the 3 core XRCA operations described below can be used in various ways to implement the object detection tasks for different object detection architectures.

The first operation is the XRCA base-model initialization. This computes the classification model using the labeled class training data initially available. This base-model can be computed simply via the multi-class, normal equations, $w_0 = (X_0^T X_0)^{-1} X_0^T T_0$ where $X_0$ represents the data matrix with dimensions of number of training samples (NbS) by number of features (F) and $T_0$ represents the multi-class, one-hot encoded labels. The normal equations can be rewritten using the initialized inverse feature covariance matrix, $M_0$ as shown in Equation (1) below.

$$M_0 = (X_0^T X_0)^{-1} \tag{1}$$
$$w_0 = M_0 X_0^T T_0$$

Note that this inverse feature covariance matrix is computed separately and will need to be passed to future stages.

The second operation enables XRCA to update its weights when there is new training data, but not yet any new training classes. The update follows the standard RLS update that uses the matrix inversion lemma to provide an efficient weight calculation for the online case of single sample updates as seen in Eq. (2).

$$M_{k+1} = M_k - M_k x_{k+1}^T (1 + x_{k+1}^T M_k x_{k+1})^{-1} x_{k+1}^T M_k \tag{2}$$
$$w_{k+1} = w_k + M_{k+1} x_{k+1}^T (t_{k+1} - x_{k+1}^T w_k)$$

Note that the RLS update requires the calculation of the updated inverse feature covariance matrix, $M_{k+1}$. This updated $M_{k+1}$ replaces the prior art standard gradient descent (SGD) learning rate with a more feature tailored step size that enables both faster convergence and, importantly, the ability to recall previously learned class feature correlations. Thus, much of XRCA's memory resides in this inverse feature covariance matrix.

The third operational stage for progressive XRCA occurs when training data for a new class arrives and the old model must be extended to accommodate this new class. In this stage, the old XRCA model matrix $w_k$ (number of features F×number of old classes NbC) is augmented with a new class initialization vector $\Delta w_k$ of size F by 1, to form the new augmented model:

$$w_k = [w_k, \Delta w_k],$$
$$\Delta w_{k+1} = \Delta w_k + M_{k+1} x_{k+1}^T (T_{Neg} - x_{k+1}^T w_k) \tag{3}$$

The new-class initialization vector or null class vector, $\Delta w_k$ is defined as the weights formed recursively using feature data with no positive new class labels, $T_{Neg}$.

In the embodiments described herein, XRCA optimization is realized in modern object detection neural network architectures (instead of a classification network), including single-shot detector (SSD) and YOLO architectures. The general approach discussed in detail below is to replace an object detector's prediction heads, which map the anchor features to class labels, with an XRCA model or prediction head that can be trained to progressively add new classes.

Next, we review the features of YOLOv3, which is a well-known, single pass, multi-scale object detection architecture. YOLOv3 built upon the highly efficient single pass concepts pioneered by Pierre Sermanet in his OverFeat paper, 'OverFeat: Integrated Recognition, Localization and Detection using Convolutional Networks', February 2014, arXiv:1312.6229, that recognized that a fully convolutional neural network complete with 1×1 convolutional layers could replace the earlier inefficient sliding window object detection approaches. The original YOLO (You Only Look Once) architecture developed by Redmon et al. and described in 'You Only Look Once: Unified, Real-Time Object Detection', June 2015, arXiv:1506.02640, improved upon the OverFeat algorithm with the introduction of the Darknet19 backbone and the introduction of grid cell labels with multiple anchor types that each contained an object confidence, bounding box coordinates, and one-hot class label.

YOLOv2 improved upon its original Darknet19 backbone by adding 11 more layers making it have a total of 30-layers. YOLOv2 also specified anchor box shapes that were optimized for a given training set's objects using k-means clustering on the object sizes. YOLOv2 also introduced an efficient zero-mean box encoding method that represents the residual values between anchors and ground truth boxes.

Still YOLOv2 faced challenges when detecting small objects due to the down sampling of the input images and loss of the fine-grained earlier feature layers.

YOLOv3, described in Redmon et al., YOLOv3: An Incremental Improvement, April 2018, arXiv:1804.02767, further improved on these earlier designs by building a still better feature extraction backbone that incorporated ResNet concepts to build a deeper and more accurate model and UNET ideas that concatenate features from earlier higher resolution layers with up-sampled features from deeper semantic layers. This combination produces features with improved lower-level localization while maintaining higher-level semantic classification performance. Finally, YOLOv3 increased the number of its prediction heads or convolutional grid maps from 1 to 3 to better detect multi-scale objects.

FIG. 1 provides a high-level block diagram of the XRCA-YOLOv3 model implementation 5 in accordance with the present embodiments. The XRCA-YOLOv3 object detection implementation model 5 uses the pretrained Ultralytics YOLOv3 backbone described in Ultralytics-YOLOv3-model@ https://github.com/ultralytics/yolo as the prediction heads feature extractor 20. The YOLOv3 feature extraction backbone 20 is called DarkNet 53 and the output of its 3 prediction heads $25_a$, $25_b$, and $25_c$ is shown in FIG. 1. The 3 prediction heads $25_a$, $25_b$, and $25_c$ are taken from different convolutional layers. The backbone 20 differs slightly from the original referenced YOLOv3 model. One difference is that the output feature dimensions for 3 different prediction heads are set to 256, 512 and 1024 instead of the original model's 256 feature dimensions for all three prediction heads. Next, the FIG. 1 model 5 operates on input images of size 480×640 instead of the original model's 416×416 size images. This has the impact of changing the dimension of the prediction head tensors to 60 (H)×80 (W)×256 (F) for the first prediction head $25_a$, 30×40×512 for the second prediction head $25_b$ and 15×20×1024 for the final prediction head $25_c$. Note however that the down sampling ratios of 32, 16 and 8 of the original YOLOv3 architecture remain the same.

These modifications result in the ultralytics YOLOv3, and therefore the XRCA-YOLOv3 model, producing a total of 18900 possible predictions on the 480×640 input image 10. These predictions are filtered down using the object confidence threshold filters ($30_{1-9}$) to detect likelihood of an object being present and a class threshold filters ($32_{1-9}$) to detect the likelihood of a given class as well as using the non-maximum-suppression (NMS) algorithm to dismiss multiple detections of the same object in the manner described for YOLOv3.

One of the changes from the original model is that the images are uniformly resized to 480 (height) by 640 (width) regardless of their original aspect size. Resizing could cause some distortion in object sizes. To compensate, images may be padded in one-dimension after resizing to minimize this distortion. Additionally, the XRCA-YOLOv3 model uses a 10:1 ratio of background examples to objects for the object detector to mitigate the background-object data skew. One skilled in the art recognizes that routine experimentation to optimize this ratio is within the scope of the embodiments.

The features produced from prediction heads $25_a$, $25_b$, and $25_c$ are used to train XRCA-YOLOv3 box-class weights to predict bounding box coordinates and object classification. Following conventional YOLOv3's rules, XRCA's box-class weights are trained on only the positive object features and use the residual anchor-object coordinates. The classification weights will use XRCA's multi-labeled, +1/−1 one-hot style of encoding. A grid cell's confidence features are labeled in the usual YOLO fashion as containing an object if that grid cell contains the centroid for a ground truth object and has the highest intersection-over-union (IOU) with the ground truth object. A grid cell's box labels are defined as the YOLO encoded residual between the ground truth object and anchor with the greatest IOU. A grid cell's class labels are defined as the class of the ground truth object that overlaps that grid cell's anchor. Note that the same set of features is used for training the box and class weights and therefore they can be combined into one box-class model.

In total, nine XRCA box-class filters $32_{1-9}$ will be used to learn the 3 different anchor types for each of the 3 multi-scale prediction heads. The actual implementation replaces the standard 1×1 convolutional filters that map these prediction head features to object predictions with a computationally equivalent linear filter that operates on each of the convolution grid cells.

Nine additional XRCA object confidence filters $30_{1-9}$ are also constructed to predict the presence or absence of an object. These filters use data consisting of both object and background features. Background cells are defined as grid cells that do not contain ground truth objects centroids and whose bounding boxes do not have an IOU overlap with ground truth objects by more than a specified threshold which is typically 50%. Note that the anchor specific labeling will result in different feature data being used to train the different anchor-type filters. This allows weights to specialize on different class shapes given the same set of features.

To evaluate the XRCA-YOLOv3 model of FIG. 1, we look at performance of its box-class weights and of its confidence weights for a given prediction-head and anchor type on the YOLOv3 extracted features using the COCO dataset described generally in Lin et al., Microsoft COCO: Common Objects in Context, arXiv:1405.0312v3 [cs.CV] 21 Feb. 2015. Performance comparisons on object accuracy, new class precision and training times are made between XRCA and prior art SGD trained models. As discussed below, performance of these filters is shown to translate into progressively learned object detection capabilities on images.

We begin our evaluation looking at the classification scores when new classes are added to the box-class weights and trained using SGD. Initially, a small 3-class base-model is built using SGD on batches containing a mixture of the first 3 classes in the COCO dataset (person, bicycle, car) for the feature data corresponding to the second prediction head (gi=1 python indexing) and second anchor type (ai=1). For this initial example, a resulting classification accuracy of 99% is obtained when applied to test features containing these three classes. Next, this 3-class model is augmented with a new 4th class, e.g., motorcycle. It is then trained in the conventional SGD manner with batches containing mixtures of all 4 classes. An overall classification accuracy of 98% across all 4 classes is obtained with the old class accuracy of 99% maintained and a new class accuracy of 95% achieved. The goal of this first experiment is simply to confirm that SGD can augment a model with a new class while remembering the old classes if given access to data from all classes.

Figure 2:
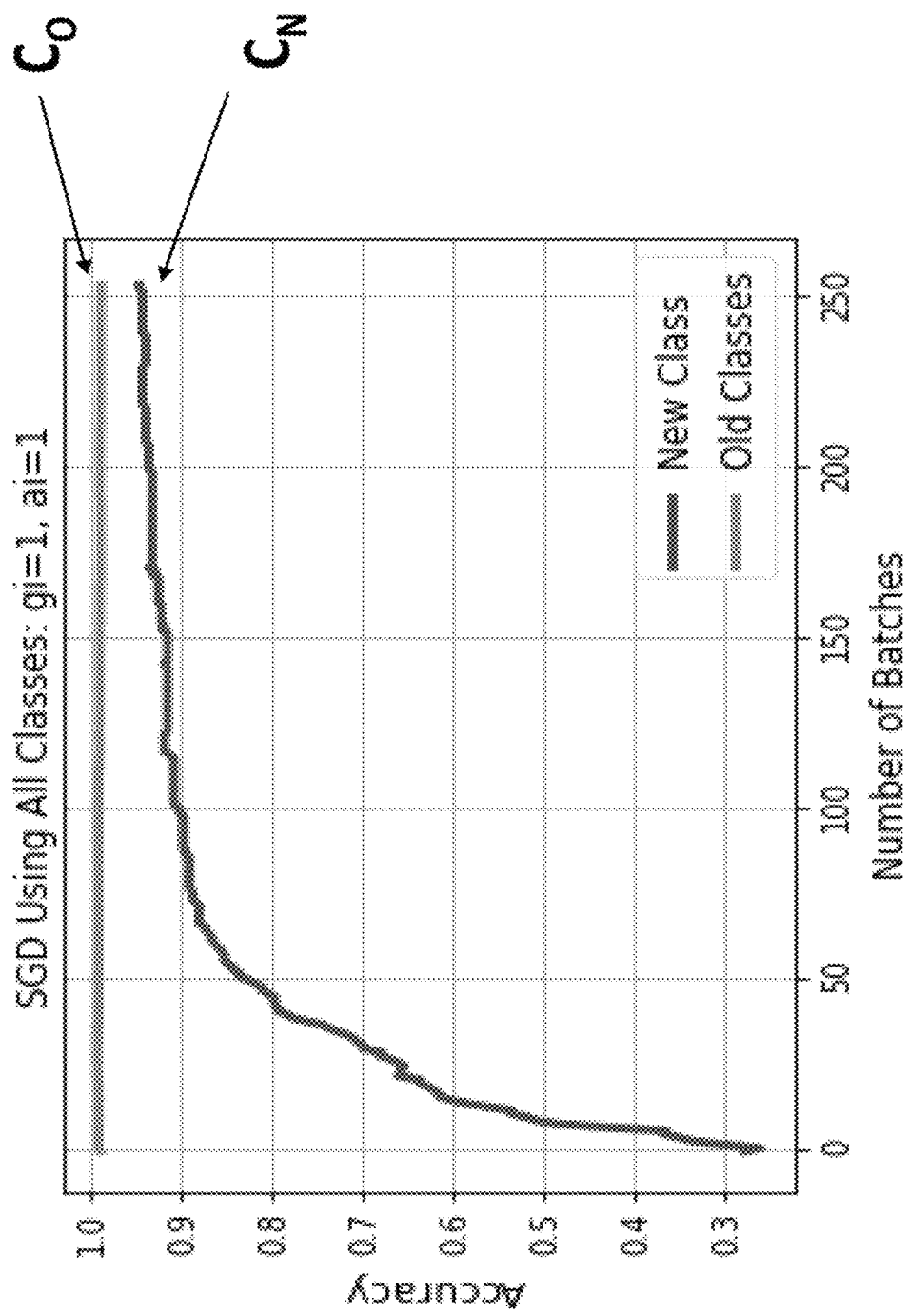
FIG. 2 plots an example wherein prior art SGD learns new class while remembering old classes when trained on both old and new class data together.

FIG. 2 highlights these observations for the (gi=1, ai=1) prediction head features. The plot shows that when SGD is trained using batches with mixtures of all 4 classes, it can learn the new class ($C_N$) while not forgetting the previously learned 3 classes ($C_O$). Similar results are obtained for the other 8 prediction heads.

However, retraining on batches containing mixtures of all classes is not optimal for continuous learning applications.

This is because it essentially requires the model to relearn what it has already been taught in order to learn the new class. Ideally, we would like a training method that could simultaneously optimize over both the old tasks and the new tasks while just being exposed to the new class training data; not training data for all classes (old+new). Accordingly, next we augment the same 3-class base model with the same new class weights, but this time we train the model's weights using SGD on data from just the new class.

Figure 3:
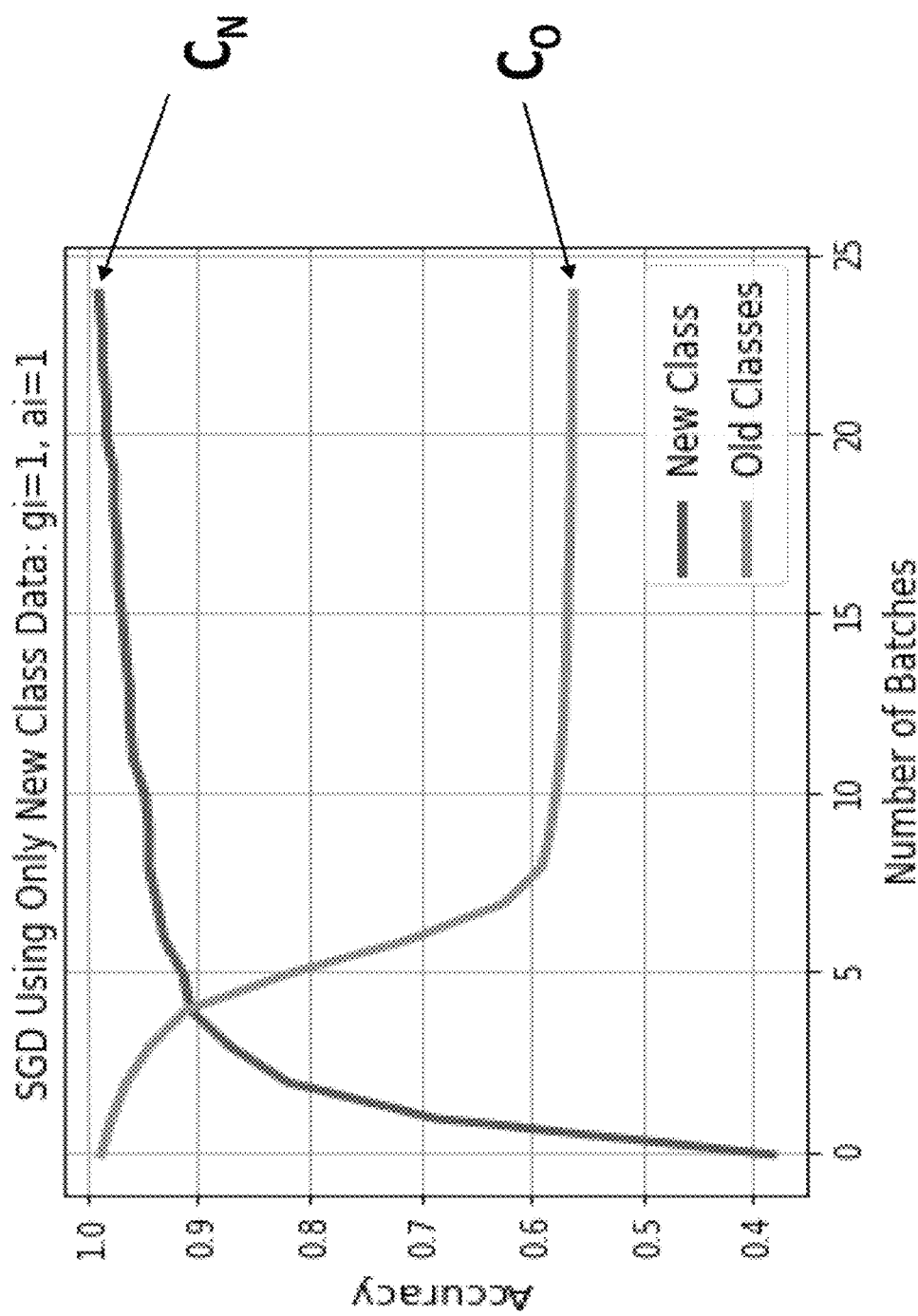
FIG. 3 plots an example wherein prior art SGD learns new class while forgetting old classes when trained on only new class data.

FIG. 3 plots the old and new class accuracy for the (gi=1,ai=1) prediction head features as a function of number of training batches. This plot now illustrates the impact of catastrophic forgetting where the new class ($C_N$) is learned but the old classes ($C_O$) performance is degraded or forgotten. FIG. 3 highlights how training on the new class data degrades the performance on the old, previously learned classes. In this case, SGD's forgetting levels out after the new class weights no longer project over the old class features.

We next look at the augmentation performance of XRCA applied to the box-class weights of a YOLOv3 model. Again, an initial 3-class XRCA-YOLOv3 base model for the box-class weights is formed and again we focus on the (gi=1, ai=1) prediction head using the same 3-class data. We note that the XRCA base model achieves a similar 99% accuracy on the first 3 classes.

Figure 4:
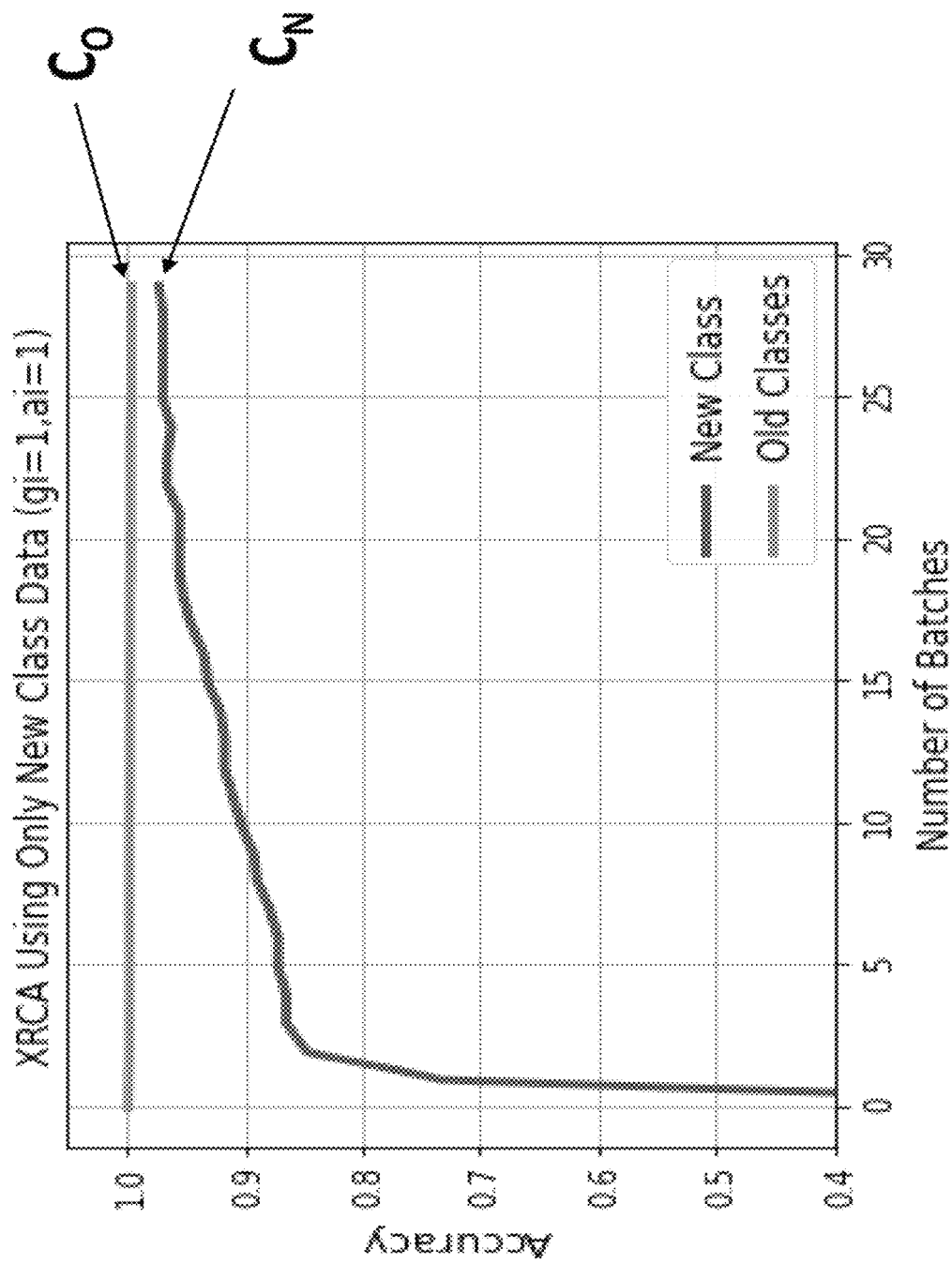
FIG. 4 plots an example wherein, in accordance with an embodiment herein, XRCA learns new class while remembering old classes when trained on only new class data.

FIG. 4 illustrates XRCA's learning of the new 4th class. It plots both the old and new class accuracy as a function of number of training batches. It shows that an XRCA class update with its different optimization approach can learn the new class ($C_N$) without effecting the performance of the previously leaned classes ($C_O$). These results highlight XRCA's ability to learn on just the new data while eliminating catastrophic forgetting.

Figure 5:
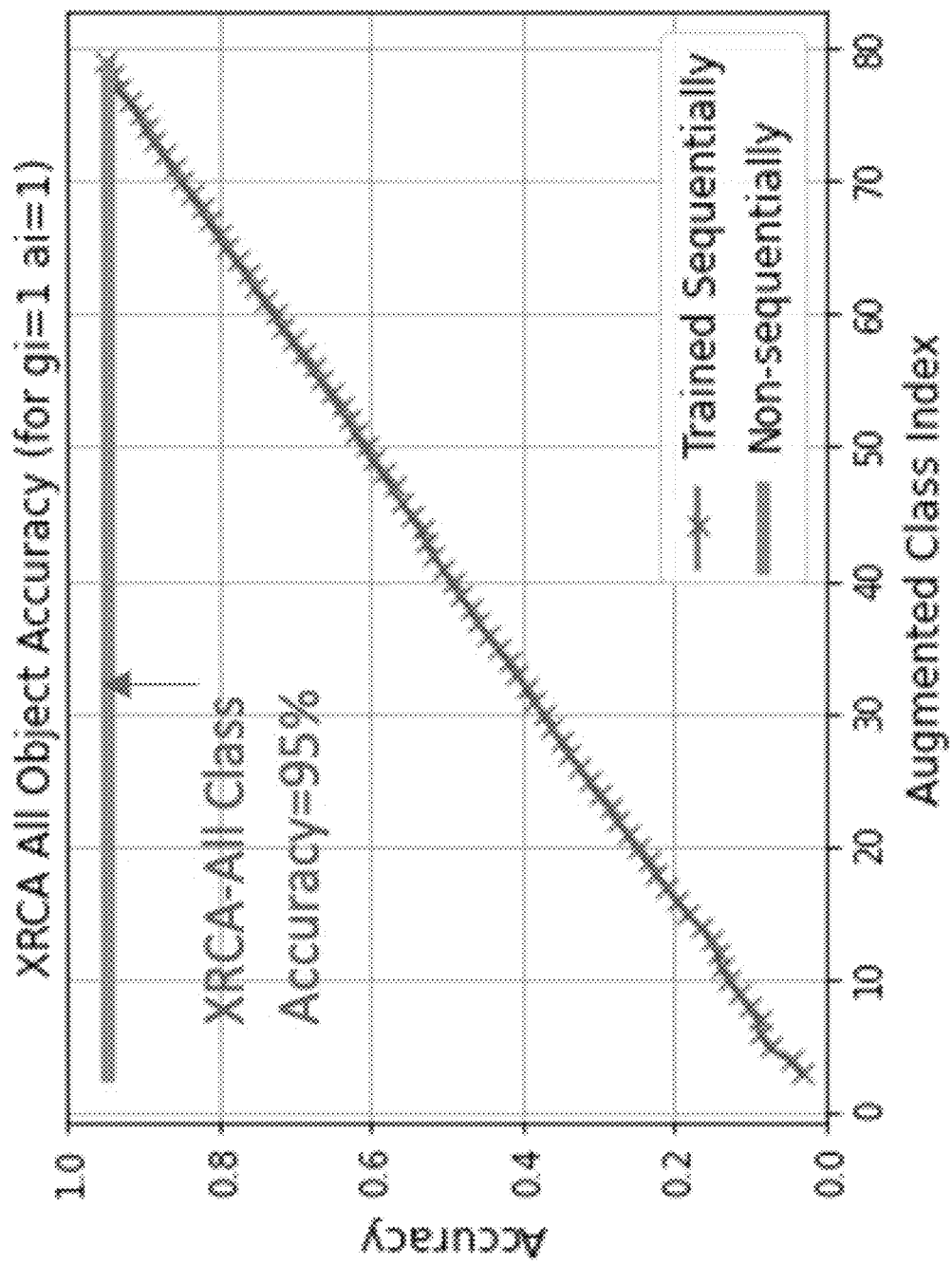
FIG. 5 plots an example wherein, in accordance with an embodiment herein, XRCA trained sequentially achieves the same results as XRCA trained non-sequentially using batches of data containing all classes.

Next, we look at the growing accuracy of the XRCA box-class weights as they are sequentially trained over all 80 object classes. After each class is added we measure the box-class weights classification accuracy on a feature test set that contains equal number of training examples for all 80 classes FIG. 5 shows the all-class accuracy for the box-class (gi=1,ai=1) filter on its prediction head features. The plot shows how the XRCA model can continuously learn new classes in a progressive manner while retaining knowledge of its previously learned classes. Similar results are obtained for the other 8 prediction heads.

Importantly FIG. 5 also shows that XRCA trained sequentially achieves the same results as XRCA trained non-sequentially using batches of data containing all classes. This indicates that XRCA has achieved the same joint training optimization as when the model can be trained on a mixture of all classes and therefore has eliminated catastrophic forgetting.

We next evaluate the augmentation performance on confidence weights. The confidence weights serve as a binary detector between object and background features. Note that the confidence weights are not augmented in the manner of adding new classes but still must be updated with new types of object data to recognize those new objects from background as they become available. Moreover, the performance metric is changed from accuracy (amongst classes) to object precision, to compensate for the large skew in the ratio of the number of background to object features which could otherwise provide a high accuracy without correctly detecting any objects. Recall that the precision metric is essentially the model's accuracy to identify a class when applied only to that class data.

An initial 2-class confidence base model is created using SGD that achieves high object recognition on the first two COCO classes (people=0.91 and bicycle=0.97). Next the base model is updated using SGD on the new car object type using a max 200 of positive object examples for each class along with a max number of 2000 background examples for each class. The number of positive object examples and training ratio between objects and background was arbitrarily selected and can readily be optimized by one skilled in the art without undue experimentation.

Note that before training the confidence weights on the new car object type, the confidence weights only identified a car object with precision of 0.06%. This supports the observation that the confidence weights do need to be updated on new object types to be able to distinguish these objects from the background. After training with SGD on car objects, the confidence model improved its car object precision to 99%. However, the SGD trained model's confidence began to degrade on the previously learned classes (person, bicycle) from 90% to 89% and 97% to 95% respectively. And when trained using SGD on additional object types the confidence weight's ability to recognize the original classes continues to get decline.

Figure 6:
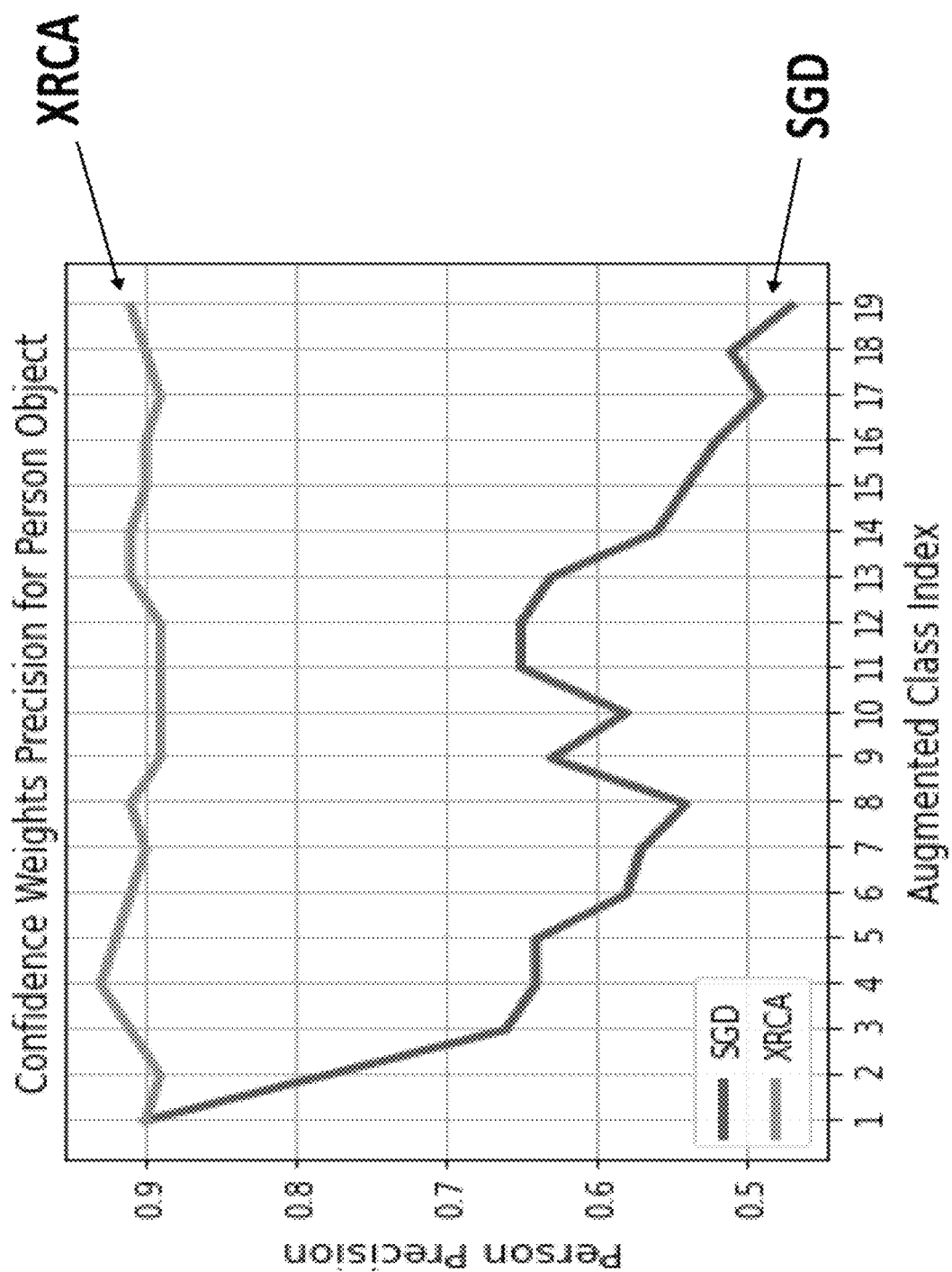
FIG. 6 plots the precision for both SDG and XRCA for the 'person' object type as additional object types are used to update the respective confidence weights.

FIG. 6 shows the precision for the 'person' object type as additional object types are used to update the confidence weights. The plot shows the decline in the ability for the SGD confidence weights trained sequentially on additional class data to recognize a person as an object type as more classes are introduced to the model.

In contrast, XRCA's model, also plotted in FIG. 6, maintains its knowledge of the 'person' class as it updates the confidence weights with the new class data. Note that for the confidence weight updates, XRCA uses only updates its weights with new data but without any model augmentation.

Figure 7:
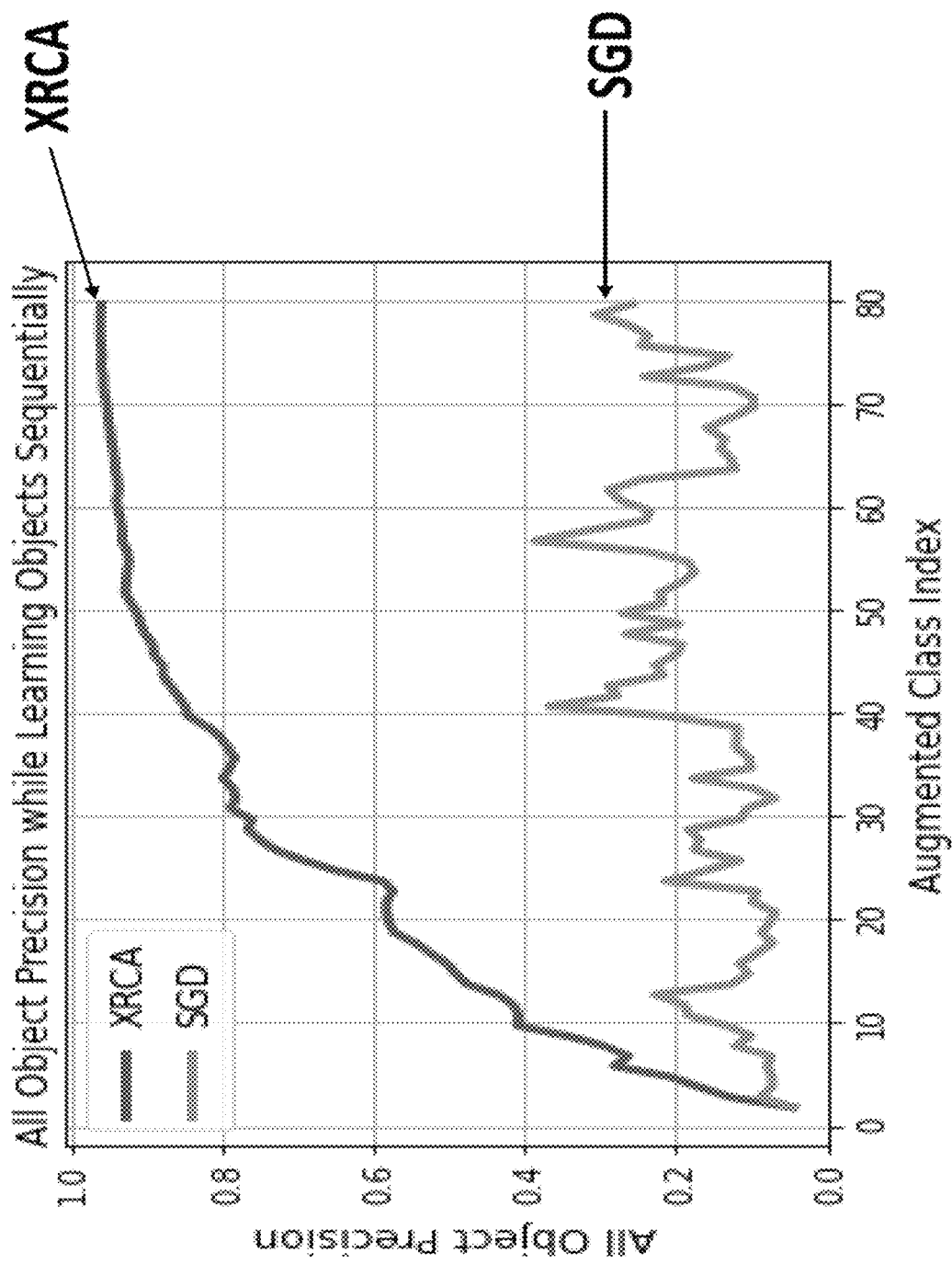
FIG. 7 plots the precision for both SDG and XRCA for all object types in an example as additional object types are used to update the respective confidence weights.
Figure 8A:
FIGS. 8A, 8B, 8C, 8D show examples of XRCA-YOLOv3 detecting, locating, and classifying objects including person (FIG. 8A), bench (FIG. 8B), skateboard (FIG. 8C), person (FIG. 8D)
Figure 8B:
Figure 8C:
Figure 8D:
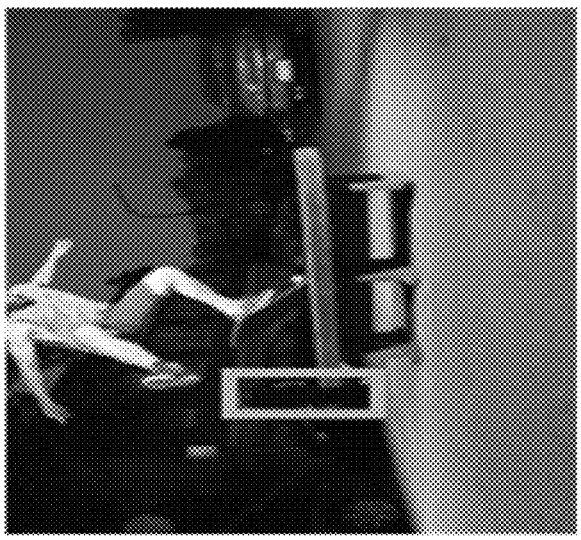

Next the precision of the confidence weights is examined in a progressive manner over a test data set containing all 80 objects as the weights are continuously updated with new types of object data. FIG. 7 plots SGD's and XRCA's object detection precision as measured on a test set containing equal values of all 80 types of objects as a function of the new object label. It shows that when SGD is used to update the confidence weights in a sequential manner on just the new object type data, it cannot retain its performance on previously learned classes and therefore is unable to learn in a progressive manner and recognize all the 80 classes.

By comparison, FIG. 7 shows that the confidence weights trained with XRCA continuously improve their precision as new object types are introduced. These results show how an XRCA model can be trained efficiently on just the new class data in a progressive manner that still avoids catastrophic forgetting. This once again illustrates XRCA's ability to eliminate catastrophic forgetting.

These results illustrate XRCA's ability to learn using just the new class data which can lead to much faster training times than conventional SGD.

Next, we quantify the time it takes XRCA to augment a model with a new class and compare that to the time it takes SGD to learn a new object with similar performance. Specifically, we look at the time it takes to add the 80th class to a 79-class box-class weight model. Both SGD and XRCA used the same 79-class base model that had accuracy of 93% over those classes. The time to augment this model with the $80^{th}$ class using pre-computed features is shown in Table 1. The Table shows that it takes SGD 4.81 seconds to update its (gi=1 ai=1) box-class weights. On the other hand, it took XRCA only 0.01 seconds to update its weights using the new class features. This results in a 481× speed-up or over 2 orders of magnitude. Similarly, the time it took SGD to augment and train all 9 of its box-class filters was close to 80 seconds while XRCA could augment and train in just 0.16 seconds, representing a 487× speed up in box-class learning times. The number of training batches SGD used was based on how many batches were necessary to achieve a similar new class precision performance while maintaining the performance on the old classes. The main cause for SGD increased augmentation time is that it must retrain over all the old class and over multiple epochs to retain performance on the old class while it learns the new class data.

TABLE 1

Box-Class Weights Augmentation Performance
Box-Class Weights Augmentation Metrics for 80$^{th}$ Class

| Training Metrics | SGD | XRCA | Speed-Up |
|---|---|---|---|
| Augmentation Time for (gi = 1, ai = 1) filter | 4.81 | 0.01 | 481× Faster |
| Augmentation Time All 9 filters | 77.92 | 0.16 | 487× Faster |

We then look at the time it takes to add the 80th class to a 79-class for the confidence weights. Table 2 shows that the XRCA 9 filter model can learn the new object type in 3.5 seconds which is 220× faster than with using SGD. The confidence weights take longer to train because there are significantly more training examples due to background examples. Again, the number of training batches SGD used was based on how many batches were necessary to achieve a similar new class precision performance while maintaining the performance on the old classes.

TABLE 2

Confidence Weights Augmentation Performance
Confidence Weights Training Metrics for 80$^{th}$ Class

| Training Metrics | SGD | XRCA | Speed-Up |
|---|---|---|---|
| Training Time for (gi = 1, ai = 1) filter | 76.52 s | 0.27 s | 283 x |
| Training Time for All 9 filters | 780.85 s | 3.55 s | 220× Faster |

Figures 9A, 9B, 9C, 9D, 9E, 9F:
FIGS. 9A, 9B, 9C, 9D, 9E, 9F show examples of some of the objects detected, located and classified by XRCA-YOLOv3 including (FIG. 9A), person (FIG. 9B), person (FIG. 9C), person (FIG. 9D), person (FIG. 9E), television (FIG. 9F))
Figure 10A:
FIGS. 10A, 10B, 10C, 10D show examples of XRCA-YOLOv3 detecting, locating, and classifying objects including knife (FIG. 10A), bowl (FIG. 10B), dining table (FIG. 10c), carrot (FIG. 10D)
Figure 10B:
Figure 10C:
Figure 10D:

FIGS. 8 to 10 show some individual examples of XRCA detecting an object, finding its bounding box and classifying it. These examples show that the progressively learned XRCA weights can be integrated into a complete YOLOv3 object detection pipeline.

In FIGS. 8A, 8B, 8C, 8D empirical examples of XRCA-YOLOv3 detecting, locating, and classifying objects are illustrated (clockwise from top-left: person (FIG. 8A), bench (FIG. 8B), skateboard (FIG. 8C), person (FIG. 8D)).

In FIGS. 9A, 9B, 9C, 9D, 9E, 9F, empirical examples of some of the objects detected, located and classified by XRCA-YOLOv3 are illustrated (clockwise from top-left: person (FIG. 9A), person (FIG. 9B), person (FIG. 9C), person (FIG. 9D), person (FIG. 9E), television (FIG. 9F)).

FIGS. 10A, 10B, 10C, 10D empirical examples of XRCA-YOLOv3 detecting, locating, and classifying objects are illustrated (clockwise from top-left: knife, bowl, dining table, carrot)

As exemplified in the embodiments described herein, the XRCA progressive learning framework is extended to a YOLOv3 object detection architecture. The results described herein illustrate that XRCA is able to train both the box-class weights and the confidence weights using just the new class data to an object detection framework while avoiding catastrophic forgetting. This capability has significant practical ramifications. First, it allows XRCA to add new classes to existing models orders of magnitude faster than conventional SGD. Second, it also reduces data storage requirements, since the old classes do not need to be stored in order to be able to augment the weights with a future new class. Third, it decouples the new class training time from the model's capacity which improves scalability. These properties can be especially important for applications out on the edge where training times can be critical and compute and memory limited.

Figure 11:
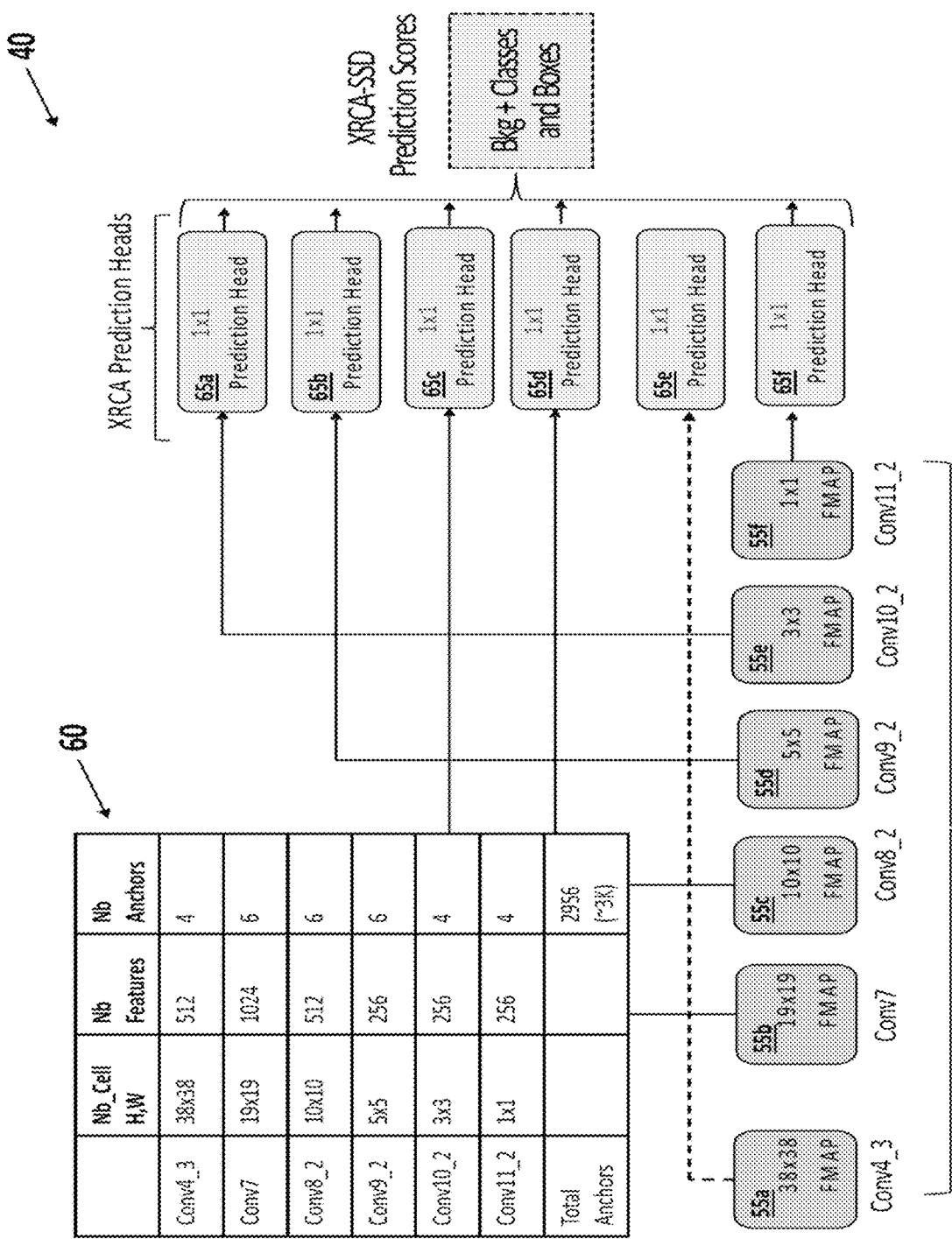
FIG. 11 a block diagram of XRCA-SSD architecture in accordance with an embodiment herein.

In a second embodiment, a SSD network architecture pre-trained on the Pascal-Voc data set is modified to implement XRCA. FIG. 11 provides a block diagram of the modified SSD architecture 40, including key components of the conventional SSD object detection architecture and the architectural modifications used in the XRCA implementation. Note that when an image is passed through the SSD feature extraction backbone 50, which consists of various convolutional layers and down samplings, it creates six different multi-scale feature maps (FMAPs) $55_{a-f}$ that are used to compute and localize the object predictions. Each of the convolutional cells in these multi-resolution feature maps are then assigned various numbers of anchors with different spatial aspects as listed in the overlaid table 60. The combination of multi-resolution feature maps and different anchor sizes improves the SSD capability to detect objects of different sizes and scales, as well as densely spaced objects. The feature map's individual convolutional cells are then labeled according to their assigned anchor boxes and used to train the SSD prediction heads $65_{a-f}$. Together the convolutional cells for all the six feature maps and their respective anchors for the standard SSD total up to 8,732 hypothesized regions of interest (ROI) in each image.

For the particular XRCA implementation embodiment described herein, only the top five convolutional layers are used and the conv4_3 feature map is removed, leaving $55_{b-f}$. This results in a reduction of the number of hypothesized ROI from 8732 to 2956 or in an elimination of almost 6K of the ~9K model anchors/ROIs. Another modification was to change the architectural structure of SSD's 3×3 convolutional prediction head to the equivalent of a 1×1 convolutional prediction filter with no bias weights. Neither of these architectural changes had a large impact on performance and resulted in significant speed-ups in training and inference.

As mentioned above, the key change is non-architectural but to use XRCA optimization to train the weights of the augmented prediction heads. The XRCA optimization algorithm can use the same labeling convention as the selected object detector (e.g., SSD-style or YOLO-style as described above). For example, the SSD labeling convention labels its training anchor features as belonging to either positive object classes or hard negative background examples. The SSD classifier trains its classifier using a cross-entropy loss on both positive object and hard negative background examples. The SSD bounding box predictor trains on only the positive object examples (with their associated ground truth bounding box labels) using a mean square error (MSE) loss. Both the classifier loss and the bounding box loss are then scaled and combined to create a single joint loss called the multi-box loss.

A convolutional cell's anchor is labeled as containing a positive object class if the ground truth labeled object's bounding box has an intersection over union (IOU) of over 50% with the cell's anchor box. A feature cell's anchor box is labeled as containing a hard-negative background class only if it scores erroneously high and above a given ranking as an object class. The rationale for using only a few hard-negative examples is to mitigate the impact of the extremely high data skew towards background classes. For example, SSD breaks an image into ~9K ROIs easily creating the opportunity for a 1000:1 data skew in background to object examples. To mitigate this skew, the original SSD implementation used a 3-to-1 ratio of hard negatives for each positive object example used. The XRCA implementation also uses this 3-to-1 training ratio.

Given the now-labeled object detection training data, XRCA optimizes an augmented model's weights for object classification in a similar manner as for the classifiers in the prior art and indeed uses the same algorithmic updates. The principal difference in the XRCA embodiment is that now instead of training the classifier weights using the entire image feature data, XRCA is optimizing the weights to classify objects in the prescribed ROI's that are designated by the anchor types associated with the features in the different feature maps. This implementation resulted in different XRCA models for each feature map and its specific anchor types.

For object localization, XRCA treats bounding box prediction as a recursive regression process where the bounding box prediction weights are sequentially updated with the new object data. Note that no specific model augmentation is necessary since the four bounding box prediction elements do not increase in number as new classes are added. Instead, the model sequentially adapts its localization weights given the new class data. Finally, the XRCA optimization replaces the standard cross-entropy classifier loss with a mean square error (MSE).

The use of SSD's hard negatives creates a chicken and egg problem. How does the model determine what is a 'hard' negative background example if it has no idea what a positive object example looks like? In the present embodiment, XRCA used a two-step augmentation training process that first uses just the positive new class training examples to get the initial weights for the new class and then sequentially updated those weights with the new hard negative examples.

After training, the XRCA prediction scores are run through an SSD-style object detection function. However, in this embodiment, the activation function for the final prediction scores is changed from a softmax activation to a sigmoid activation. This allows a multi-label ontology (where a single class can predict multiple labels, e.g., man and person) which can be useful when the future class ontology is uncertain and future classes are not necessarily independent of previous classes. Perhaps more importantly, the sigmoid detection metric simplifies the detection threshold for models with a consistently changing number of classes, which is important in implementing a progressive learning process. A drawback to the use of the sigmoid function is that its performance is worse than softmax. Table 3 below summarizes the implementation modifications of the XRCA-SSD implementation.

TABLE 3

| | Standard SSD Implementation | XRCA-SSD Implemenation |
|---|---|---|
| Backbone Feature Extractor | Uses 8732 anchors | Uses 2956 anchors |
| Prediction Head Architecture | 3 × 3 convolutional | 1 × 1 convolutional |
| Optimizer | SGD | XRCA |
| Score Activation | softmax | sigmoid |

The performance of an XRCA-SSD model implementation for progressive object detection is assessed in three different ways as discussed below on the well-known Pascal-Voc data set, which consists of 20 classes (airplane, bicycle, bird, boat, bottle, bus, car, cat, chair, cow, dining table, dog, horse, motorbike, person, potted plant, sheep, sofa train, and tv-monitor).

Figure 13:
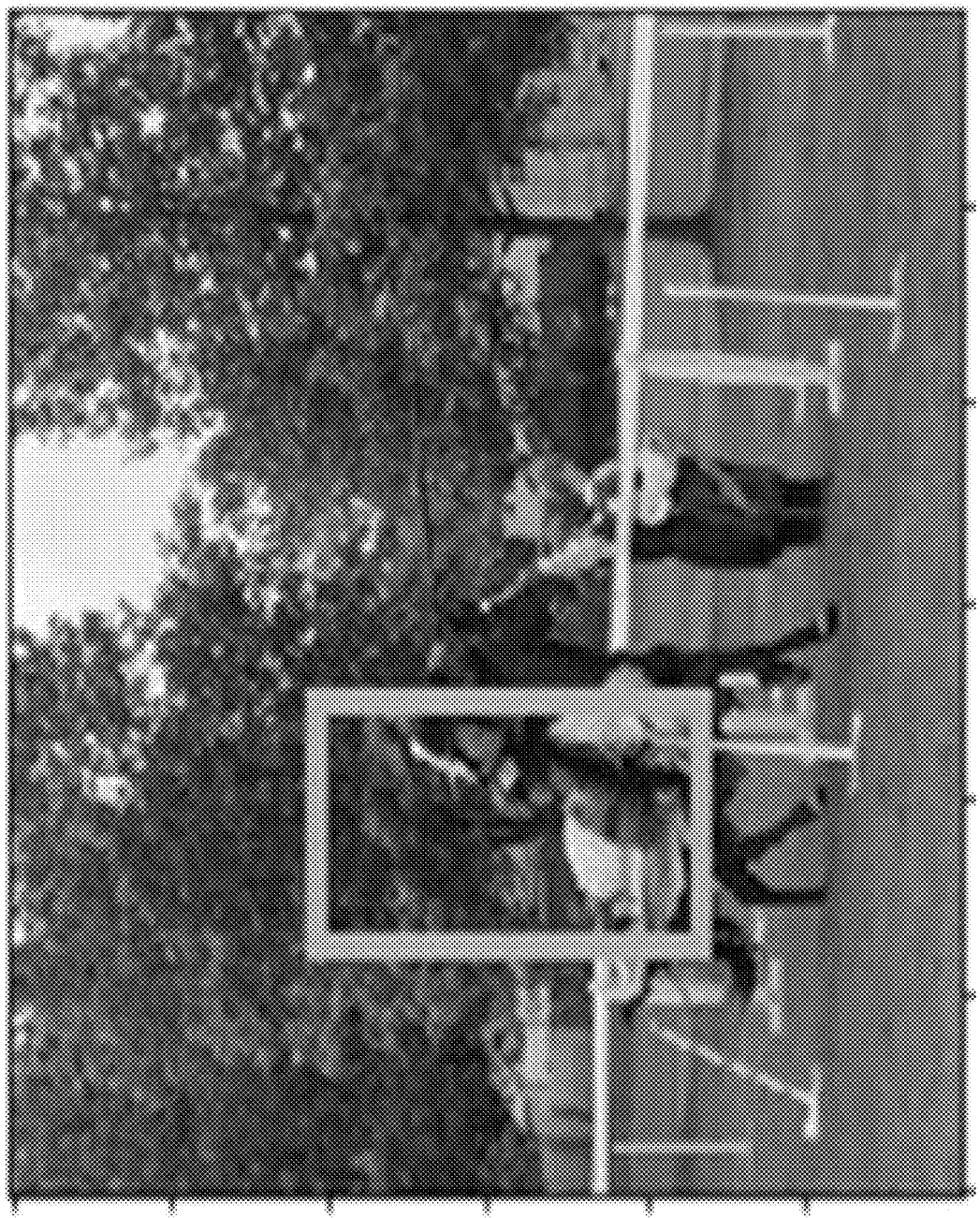
FIG. 13 shows an example of a single detection error by the XRCA-SSD model in a particular implementation.

FIGS. 12A, 12B, 12C, 12D, 12E, 12F, 12G, 12H, 12I, 12J, 12K, 12L, 12M, 12N, 12O show the objects correctly detected by the XRCA-SSD model over a small group of eight images. For each of the examples shown, the XRCA-SSD model correctly detected, classified, and located the object classes. The only prediction error that occurred in this batch was for the jousting image and is shown in FIG. 13. For that image, while XRCA correctly detected the horse and two separate bystanders as people it double detected the rider. This is likely due to insufficient training examples of hard negatives for regions surrounding the person detection.

These results confirm that the SSD prediction heads can be replaced with progressively trained XRCA prediction heads to provide useful object detection capabilities and that the architectural modifications and XRCA's MSE loss function did not severely limit the model's detection utility.

The XRCA-SSD implementation of this second embodiment has the ability to progressively add new classes while not forgetting prior classes when only trained on the new class data. By way of example, we start with an initial two-class XRCA base model and then sequentially adds 18 new classes. Sequential classes are added in a two-step procedure where the weights are initially trained on positive class examples and then cycled through just the hard negatives examples (once the model has some idea what a hard negative is) using a 3-to-1 hard negative ratio. A detection threshold of 0.36 was used on the sigmoid activated class scores across the addition of all 18 new classes.

Figure 14:
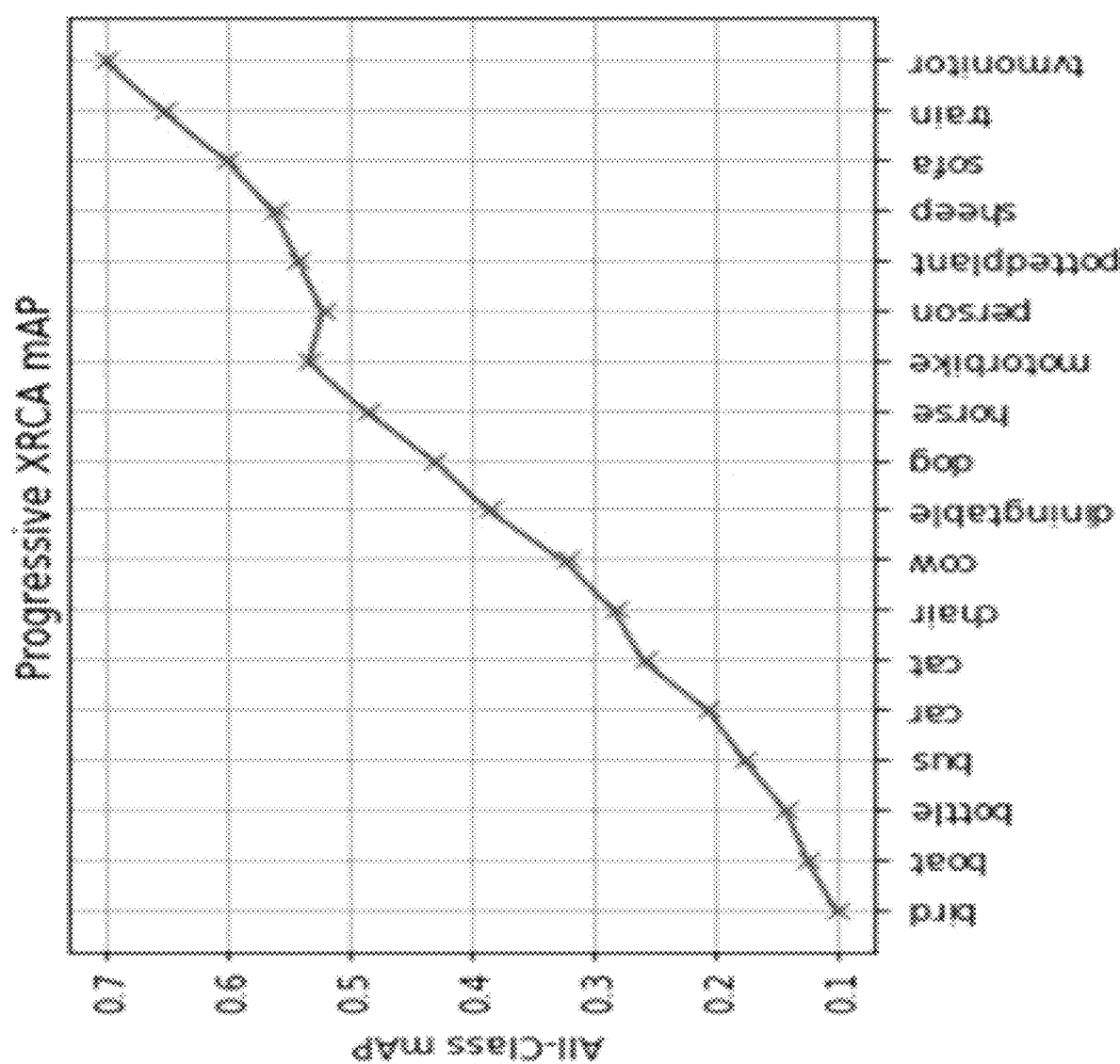
FIG. 14 highlights the progressive capabilities of an XRCA trained object detector by evaluating the XRCA-SSD model's mAP across data containing a mixture of all 20 classes of the Pascal-Voc data set.

FIG. 14 highlights the progressive capabilities of an XRCA trained object detector by evaluating the model's mAP across data containing a mixture of all 20 classes. As expected, as the XRCA trained model progressively learns additional classes its mAP performance measured across all classes increases.

As discussed above with respect to the XRCA-YOLOv3 implementation, there are benefits to using XRCA optimization for progressive learning compared to SGD optimization. To facilitate the comparison, both optimizers use the same feature extraction backbone architecture and labeling conventions, and both are given the same new class training data (comprised of both positive object and hard negative training examples). In other words, the progressive SGD implementation uses the same SSD modifications described previously with respect to FIG. 11 and Table 3 (e.g., 2,976 anchors, sigmoid activation, etc.) which results in the same anchor features and labels as used in the XRCA implementation.

In the SGD implementation, the augmented new class vector algorithm is initialized with a scaled random (but pre-selected, for repeatability) weight vector and trained for 100 epochs using a learning rate that was selected to avoid unstable weight updates while still allowing learning (lr=1e-7). For the XRCA implementation, the augmented new class vector is initialized as the current model's null-class vector. Note that RLS, and therefore XRCA, has an optimized learning rate pre-built into its update equations and therefore does not require selecting a learning rate parameter. However, both SGD and XRCA require some fine-tuning for determining the detection threshold which can be dependent on several factors such as the hard-negative to positive object ratio and the degree to which the previous classes hard negatives interfere with new class positive object examples. The result is that the detection threshold should generally be lowered as more new classes are added. A detection threshold of 0.4 was used for this comparison.

For this comparison, we augmented a 19-class prediction head with a new 20th class (tv monitor). Results are shown in Table 4.

TABLE 4

|  | Old Class mAP (over 19 classes) - before augmentation | Old Class mAP (over 19 classes) - after augmentation | New Class AP (on 20$^{th}$ class) |
| --- | --- | --- | --- |
| Initial 19 class model | .77 | N/A | N/A |
| Progressive SGD | .77 | .66 | .17 |
| XRCA-SSD | .77 | .77 | .86 |

Both Progressive SGD and XRCA begin with the same baseline mAP performance across the previously learned 19 object classes and both have an initial a mAP of ~77% (across the 19 classes, 73% across a test batch containing all 20 classes). However, when the augmented prediction head is trained using SGD on just the new 20th class training data, the augmented model struggles to remember the previously learned classes and its mAP performance over the previously learned 19 classes drops from 77% to 0.66%. This is because the optimizer is focusing on minimizing the loss in the current training batch that contains just the new class examples and ignores how those weight updates affect the performance of the old classes.

More striking is the observation that the SGD-trained prediction head has difficulty even learning to recognize the new class. It was determined that the issue was that the newly augmented model began to recognize every interesting feature as the new class and forgot the hard negatives associated with the other classes. This resulted in a high number of False Positive (FP) predictions (FP indicates that the model is detecting the class when the class is not present) which strongly impacts the precision metric (precision=TP/(TP+FP), where TP=true positive, FP=false positive). The result is SGD failed to learn to recognize the new class (17% mAP) even after 100 training epochs. Note it was observed that the new class mAP slowly increased in value even as it was forgetting the other classes for the first ~100 training epochs.

In comparison, when the prediction head is trained using XRCA's approach, one can see from Table 4 that the XRCA prediction head remembers its previously learned classes and preserves its 77% mAP across previously learned classes even when trained using just the new class data. Furthermore, an XRCA trained prediction head learns in a single epoch the new class resulting in an 86% mAP. This further reflects XRCA's ability to learn to recognize the new class while not forgetting the old classes.

It is submitted that one skilled in the art would understand the various computing environments, including computer readable mediums, which may be used to implement the methods described herein. Selection of computing environment and individual components may be determined in accordance with memory requirements, processing requirements, security requirements and the like. It is submitted that one or more steps or combinations of steps of the methods described herein may be developed locally or remotely, i.e., on a remote physical computer or virtual machine (VM).

Virtual machines may be hosted on cloud-based IaaS platforms such as Amazon Web Services (AWS) and Google Cloud Platform (GCP), which are configurable in accordance memory, processing, and data storage requirements. One skilled in the art further recognizes that physical and/or virtual machines may be servers, either stand-alone or distributed. Distributed environments many include coordination software such as Spark, Hadoop, and the like. For additional description of exemplary programming languages, development software and platforms and computing environments which may be considered to implement one or more of the features, components and methods described herein, the following articles are referenced and incorporated herein by reference in their entirety: Python vs R for Artificial Intelligence, Machine Learning, and Data Science; Production vs Development Artificial Intelligence and Machine Learning; Advanced Analytics Packages, Frameworks, and Platforms by Scenario or Task by Alex Cistrons of Innoarchitech, published online by O'Reilly Media, Copyright InnoArchiTech LLC 2020.

All documents referenced herein, including articles, patents and patent applications are herein incorporated by reference.

The invention claimed is:

1. A computer-implemented process for augmenting an object detection architecture for detecting objects in an image, comprising:
    training an object detection architecture trained to detect for n object classes to detect for n+c object classes, wherein the object detection architecture is trained to detect for n+c object classes using training data for only the c object class, wherein c≥1; and
    further wherein an object detection accuracy for the n object classes is maintained after the object detection architecture is trained to detect for n+c object classes using training data for only the c object class.

2. The computer-implemented process according to claim 1, wherein the object detection architecture includes multiple prediction heads for predicting features from the image.

3. The computer-implemented process according to claim 2, wherein the object detection architecture includes one or more filter models each filter model including a prediction weight matrix, an inverse feature covariance matrix, and a null-class vector.

4. The computer-implemented process according to claim 1, wherein the object detection architecture is selected from the group consisting of a You Only Look Once (YOLO) architecture and a single shot detector (SSD) architecture.

5. The computer-implemented process according to claim 3, wherein training object detection architecture includes: assigning a null-class initialization vector $\Delta w_k$ to new class c in the one or more filter models.

6. The computer-implemented process according to claim 5, further comprising optimizing weights for each trained n+c class vectors, including $\Delta w_k$.

7. The computer-implemented process according to claim 6, wherein the one or more filter models prior to training the object detection architecture to detect for n+c object classes are in matrix form, $w_k$=number of features (F)×(number of old classes (n)) and the one or more filter models after training the object detection architecture to detect for n+c object classes is in matrix form, $w_k=[w_k, \Delta w_k]$, wherein the null-class initialization vector $\Delta w_k$ is defined as:

$$\Delta w_{k+1} = \Delta w_k + M_{k+1} x_{k+1} (T_{Neg} - x_{k+1} \Delta w_k),$$

wherein $M_{k+1} = M_k - M_k x_{k+1}{}^T (1 + x_{k+1}{}^T M_k x_{k+1})^{-1} x_{k+1}{}^T M_k$, $M_k$ is the augmented classification model's inverse covariance matrix and $T_{Neg}$ represents an Ns×1 matrix of negative one labels indicating that none of the old class data correspond with the new class c.

8. The computer-implemented process according to claim 3, wherein the one or more filter models are trained using a modified recursive least squares (RLS) algorithm.

9. The computer-implemented process according to claim 3, wherein the one or more filter models are selected from the group consisting of confidence filter models, box-class filter models and bkg-class filter models.

10. The computer-implemented process according to claim 4, wherein the object detection architecture includes one or more filter models selected from the group consisting of confidence filter models, box-class filter models and bkg-class filter models.

11. The computer-implemented process according to claim 10, wherein for the YOLO architecture the one or more filter models are confidence filter models and box filter models and for the SSD architecture the one or more filter models are box filter models and bkg-class filter models.

* * * * *